Aug. 29, 1961   A. CONSTANTINO   2,997,907
SELF ALIGNING PUNCHING APPARATUS
Filed Nov. 22, 1957   2 Sheets-Sheet 1
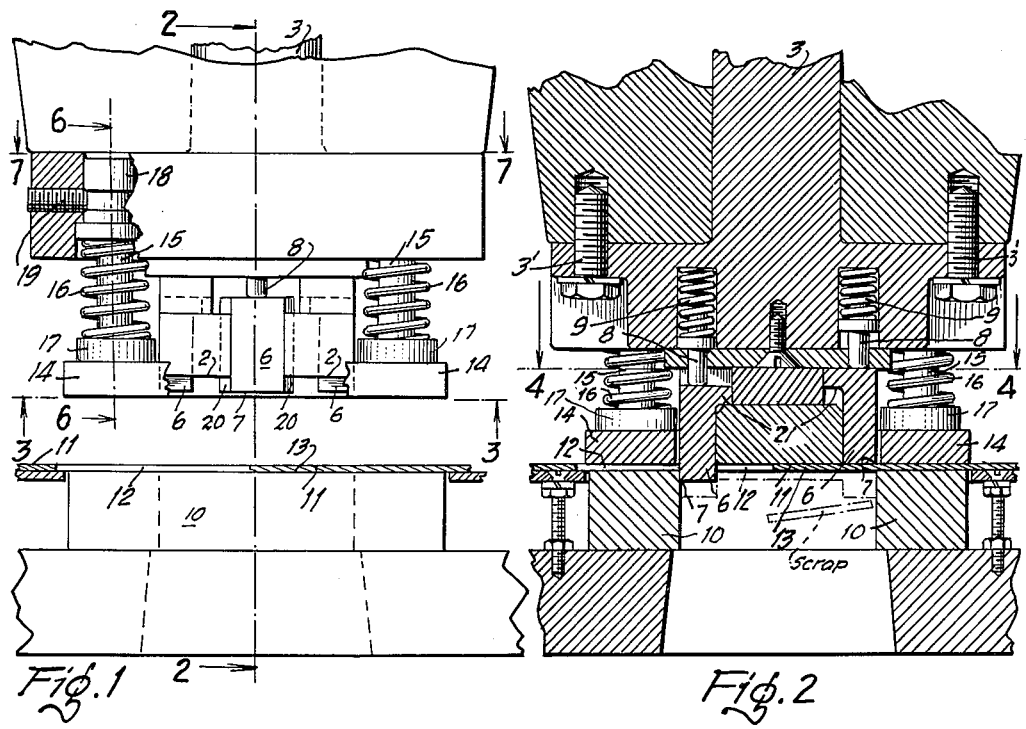
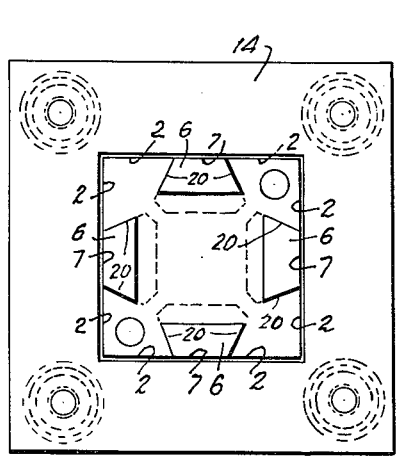
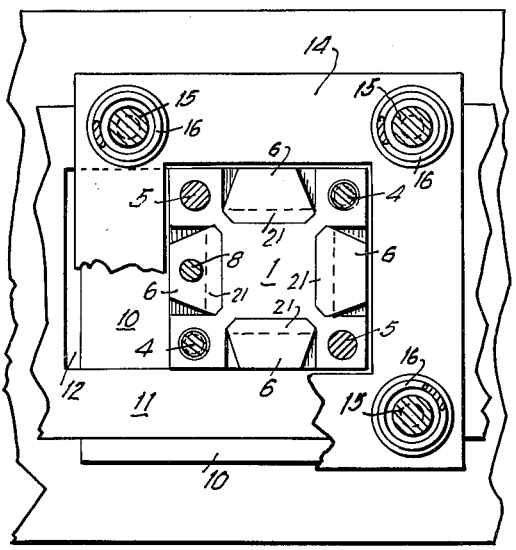
INVENTOR.
Alfred Constantino
BY
His Attorneys Aug. 29, 1961  A. CONSTANTINO  2,997,907
SELF ALIGNING PUNCHING APPARATUS
Filed Nov. 22, 1957  2 Sheets-Sheet 2
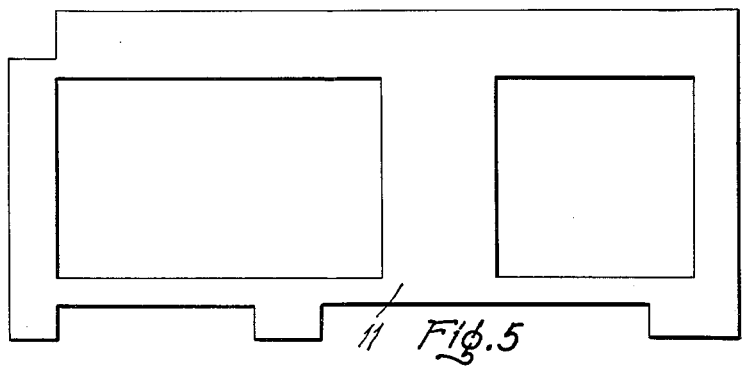
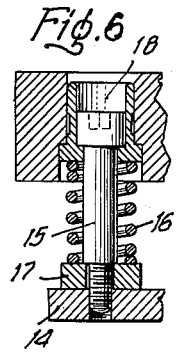
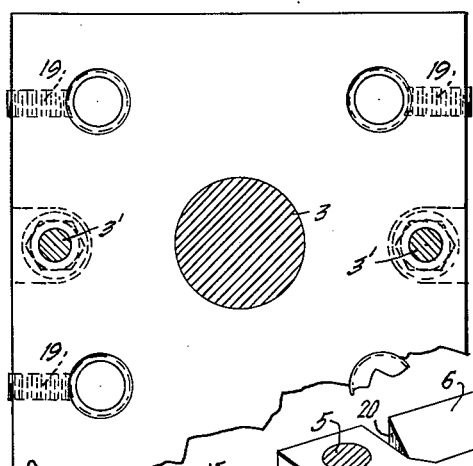
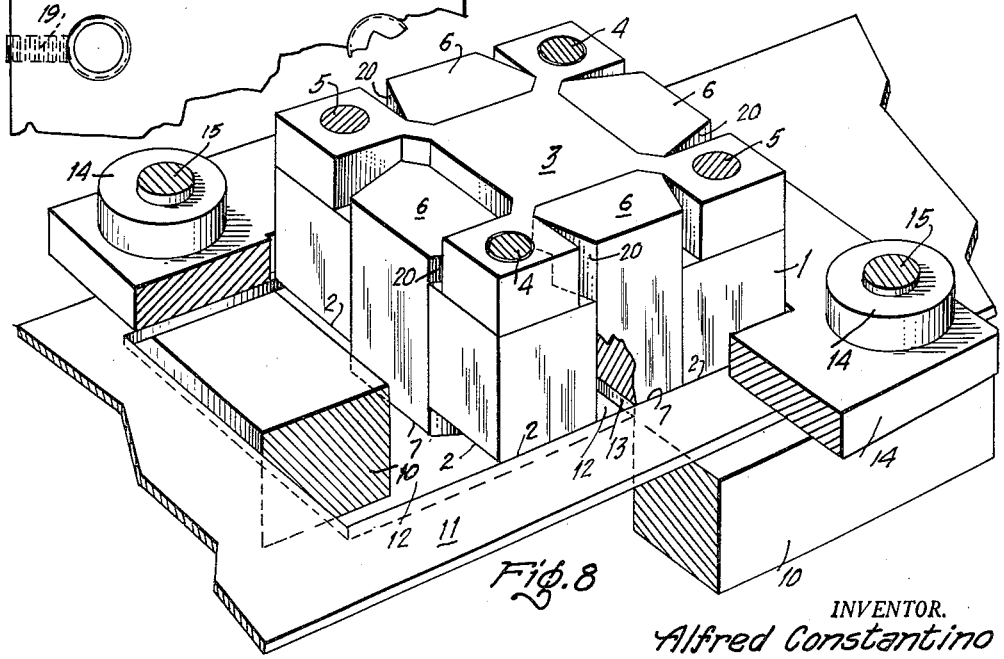
INVENTOR.
Alfred Constantino
BY
His Attorneys

2,997,907
SELF ALIGNING PUNCHING APPARATUS
Alfred Constantino, 2008 Wabash Ave.,
Schenectady 1, N.Y.
Filed Nov. 22, 1957, Ser. No. 698,206
6 Claims. (Cl. 83—635)

My invention relates to devices for punching sheet metal and other sheet materials and particularly to improvements in the male members of such devices.

In my Patent No. 2,341,976 of February 15, 1944, I have disclosed a punch which functions very well for punching rectangular holes or notching the edges of sheet material, but it sometimes fails to function properly in nibbling or slotting the work.

In forming a slot or elongated opening in the work, a hole is first punched therein and then the work is moved so that additional material is nibbled or punched from the work at one side or end of the hole first punched therein.

The punch disclosed in my patent aforesaid has a male member with relatively fixed, centrally disposed cutting edges and movable cutting edges at each corner thereof. In notching, the movable members on the side of the male member opposite the portion which is to form the notch enter the female member before the male member strikes the work and thus prevent deflection of the male member relative to the female member. However, since the movable edges are at the corners of the male member it sometimes happens that in slotting or nibbling the work the movable members on the side of the punch opposite the side which is to be used for the slotting are prevented from entering the female member because they contact the work at the edges of the hole previously punched therein.

The principal object of my invention, therefore, is to provide a punch which can be used for punching holes in the work, cutting notches therein and also cutting slots or otherwise forming slots in the work and in which the male member is provided with movable portions which can always enter the female member and prevent deflection of the male member when the punch is used for slotting or nibbling. A further object is to provide a punch having a stripper surrounding the male element and which contacts the work to be punched before the male member comes in contact therewith. A further object is to provide such a stripper which is readily removable when the punch is to be used for notching and which can be easily adjusted to provide the proper clearance between the cutting edges of the male and female members of the punch after metal has been removed from the cutting edges by the sharpening thereof.

I accomplish these objects by the means described below and illustrated in the accompanying drawings, in which—

FIG. 1 is a side elevation view of the punch in retracted position with portions broken away, and minor details omitted.

FIG. 2 is a section of FIG. 1 in the plane 2—2, but showing the male member of the punch moved down and about to lengthen a square hole previously punched by nibbling a piece of the material from the right hand end of said hole;

FIG. 3 is a section of FIG. 1 in the plane 3—3;

FIG. 4 is a section of FIG. 2 in the plane 4—4 with portions broken away;

FIG. 5 is a plan view of a strip of material that has been notched, punched and nibbled;

FIG. 6 is a section of FIG. 1 in the plane 6—6;

FIG. 7 is a section of FIG. 1 in the plane 7—7 with portions broken away; and

FIG. 8 is an isometric view of the male member of the punch showing it in nibbling position; a portion of the female member and stripper; and a portion of a strip which has been punched and from which another piece is about to be nibbled, or cut therefrom, to form an elongated opening therein such as shown in FIG. 5.

Referring to the drawings, and first to FIG. 8, the male member 1 has fixed cutting edges 2 at each corner thereof which are secured to the plunger 3 by cap screws 4 and dowels 5, and the plunger is secured to the head by cap screws 3'. As illustrated, the male member is provided with a centrally disposed element 6 at each side thereof. Said elements have cutting edges 7 and are mounted to slide vertically in the head between a position in which their cutting edges form with the adjacent cutting edges 2 a substantially continuous cutting edge on each side of the male member, and a position in which the cutting edges 7 project below or beyond the cutting edges 2. The cutting edges on the members 6 are normally but yieldingly positioned in advance of the fixed cutting edges on the male member by means of the pins 8 (see FIG. 2) and the springs 9. Thus, if the head of the punch is moved downwardly and there is no work to be punched, each of the members 6 will enter the female member 10.

In FIGS. 1, 2, 4 and 8, 11 is the strip in which the opening 12 has been punched, and another portion 13 of the strip is about to be nibbled or punched out from the right-hand end of the opening 12. Thus, the centrally disposed element 6 which is on the side opposite the nibbling portion of the male member is free to enter the female member 10, as shown in FIG. 2, and prevent the male member from being deflected when only a part of it strikes the strip or work 11.

Surrounding the male member of the die is a stripper 14 which is yieldingly secured to the head 3 by means of four cap screws 15 (see FIGS. 1, 2 and 6), helical springs 16 surrounding the cap screws, washers 17, and bushings 18 which are secured in place by the studs 19.

Normally, the stripper extends somewhat below the cutting edges of the male member so that when the head moves downwardly the stripper contacts the work before the male member. The distance which the stripper extends below the cutting edges is adjustable to some extent by means of the cap screws 15, but where a substantial amount of metal is removed from the cutting edges by the sharpening thereof so that the distance between the cutting edges of the male and female members is increased to a greater extent than can be compensated by adjustment of the cap screws 15, the washers 17 may be removed and ground so that their thickness is reduced. When the punch is to be used for notching, the stripper assembly can be readily removed by merely removing or loosening the studs 19.

As pointed out above, the centrally disposed elements 6, at each side of the male member 1, are a part thereof and are slidably mounted in said member. It will be clear from the drawings that the sides 20 of the elements 6 are plane surfaces which converge toward the sides thereof having the cutting edges thereon and the surfaces of the member 1 on which the sides of the elements 6 slide are also plane surfaces which converge toward the outer sides of the member. The elements 6 are provided at the top with inwardly projecting portions 21, which are perhaps best shown in FIGS. 2 and 4, and which serve to limit the extent of their downward movement.

While I have described my invention in its preferred embodiment, it is to be understood that the words which I have used are words of description rather than of limitation and that changes, within the purview of the appended claims, may be made without departing from the true scope and spirit of my invention in its broader aspects.

What I claim is:

1. A punch having a male punch member and a female member having cutting edges thereon adapted to cooperate with cutting edges on the male member, said male member adapted to punch a rectangular opening in sheet material and comprising a first element, a first side portion of said first element, a second side portion of said first element forming with said first side portion a first corner, a third side portion of said first element, a fourth side portion of said first element forming with said third side portion a second corner, a fifth side portion of said first element, a sixth side portion of said first element forming with said fifth side portion a third corner, a seventh side portion of said first element, an eighth side portion of said first element forming with said seventh side portion a fourth corner, said side portions being relatively fixed and formed with coplanar lower cutting edges; and identical second elements, each of said second elements having a side formed with a lower cutting edge and each of said second elements being disposed between two of said side portions and being slidable in said first element between a position in which the cutting edge thereof is aligned with the lower cutting edges of the side portions of said first element on either side thereof and forms therewith a substantially continuous cutting edge, and a position in which the cutting edge thereof projects beyond the lower cutting edges of the side portions of said first element on either side thereof, prior to when said male and female member are in cutting cooperation, being adapted to be received in the opening in the female member defined by the cutting edges thereon to prevent deflection of said male member during the punching operation; additional sides of each of said second elements being plane surfaces converging toward said sides formed with the cutting edges thereon, and said first element having axially extending passages with plane boundary walls with which the converging said additional sides slide in contact.

2. A punch having a male punch member with cutting edges thereon adapted to punch a rectangular opening in sheet material, and a female member having cutting edges thereon adapted to cooperate with the cutting edges on the male member, said male member having sides joining at right angles and the cutting edges on adjacent sides thereof forming fixed corner sections of said male member, channels formed in said male member intermediate the fixed corner sections, an intermediate section disposed within each of said channels with a lower cutting edge formed thereon; each of said intermediate sections being in slidable contact with said male member between a position with its cutting edge in alignment with the adjacent cutting edges of the sides and forming therewith a substantially continuous elongated cutting edge, and a position in which its cutting edge is coplanar with but projects beyond the cutting edges forming the corner sections; and resilient means cooperating with each of said intermediate sections and yieldingly maintaining its respective cutting edge projecting beyond the cutting edges forming the corner sections, and at least one of said intermediate sections, prior to when said male and female member are in cutting cooperation, being adapted to be received in the opening in the female member defined by the cutting edges thereon to prevent deflection of said male member during the punching operation.

3. The structure set forth in claim 1 in which said first element and said second elements are provided with cooperating means in the form of abutting ledges positively limiting the extent to which the cutting edges of said second elements can project beyond the cutting edges on said first element; and resilient means cooperating with said second elements normally, but yieldingly, maintaining the cutting edges thereon in projecting position.

4. A punch having a male punch member with cutting edges thereon adapted to punch a rectangular opening in sheet material, and a female member having cutting edges thereon adapted to cooperate with the cutting edges on said male member; said male member having sides joining at right angles and the cutting edges on adjacent sides thereof forming fixed corner sections of said male member, channels formed in said male member intermediate the fixed corner sections, an intermediate section disposed within each of said channels with a lower cutting edge formed thereon; each of said intermediate section being in slidable contact with said male member between a position with its cutting edge in alignment with the adjacent cutting edges of the sides and forming therewith a substantially continuous elongated cutting edge, and a position in which its cutting edge is coplanar with but projects beyond the cutting edges forming the corner sections; and resilient means cooperating with each of said intermediate sections and normally, but yieldingly, maintaining its respective cutting edge projecting beyond the cutting edges forming the corner sections; whereby, when the cutting edges of said punch other than said one edge are used for nibbling, the work being nibbled will not interfere with the movement of said intermediate section into said female member and at least one of said intermediate sections, prior to when said male and female member are in cutting cooperation, being adapted to be received in the opening in the female member defined by the cutting edges thereon to prevent deflection of said male member during the punching operation.

5. The structure set forth in claim 4 in which the surfaces on each respective said intermediate section and those on said male member which are in slidable contact with each other include plane surfaces at the opposite sides of said intermediate section which are parallel to the axis of said punch but converge toward the outer side of said male member; whereby the cutting edge on said intermediate section is maintained coplanar with the cutting edges on said end sections.

6. The structure set forth in claim 2 in which the surfaces on said intermediate sections and those on said male member which are in slidable contact with each other include plane surfaces at the opposite sides of each of said intermediate sections which are parallel to the axis of said punch but converge toward the outer side of said male member; whereby the cutting edge on each of said intermediate sections is maintained coplanar with the cutting edges on the adjacent end sections.

References Cited in the file of this patent

UNITED STATES PATENTS

| | | |
|---|---|---|
| 828,225 | Lorenz | Aug. 7, 1906 |
| 1,571,672 | Jayne | Feb. 2, 1926 |
| 1,683,501 | Tobeler | Sept. 4, 1928 |
| 2,168,377 | Wales | Aug. 8, 1939 |
| 2,341,976 | Constantino | Feb. 15, 1944 |
| 2,501,682 | Kuchman | Mar. 28, 1950 |
| 2,656,887 | Judd | Oct. 27, 1953 |

OTHER REFERENCES

American Machinist, vol. 93, No. 24 December 1, 1949.